United States Patent
Toncelli

(10) Patent No.: US 8,940,223 B2
(45) Date of Patent: Jan. 27, 2015

(54) METHOD OF MANUFACTURING SLABS OF CERAMIC MATERIAL

(76) Inventor: Luca Toncelli, Bassano del Grappa (IT)

(*) Notice: Subject to any disclaimer, the term of this patent is extended or adjusted under 35 U.S.C. 154(b) by 0 days.

(21) Appl. No.: 12/532,699

(22) PCT Filed: Mar. 14, 2008

(86) PCT No.: PCT/IB2008/050966
§ 371 (c)(1),
(2), (4) Date: Sep. 23, 2009

(87) PCT Pub. No.: WO2008/117193
PCT Pub. Date: Oct. 2, 2008

(65) Prior Publication Data
US 2010/0052225 A1    Mar. 4, 2010

(30) Foreign Application Priority Data

Mar. 28, 2007 (IT) .............................. TV2007A0054

(51) Int. Cl.
*C04B 35/18* (2006.01)
*B28B 1/00* (2006.01)
(Continued)

(52) U.S. Cl.
CPC ................ *C04B 35/18* (2013.01); *B28B 1/008* (2013.01); *B28B 3/022* (2013.01); *B28B 7/342* (2013.01); *B28B 7/368* (2013.01); *C04B 33/04* (2013.01); *C04B 33/1305* (2013.01); *C04B 33/131* (2013.01); *C04B 33/30* (2013.01); *C04B 35/6316* (2013.01); *C04B 35/63416* (2013.01); *C04B 35/636* (2013.01); *C04B 35/6365* (2013.01); *C04B 38/0615* (2013.01);
(Continued)

(58) Field of Classification Search
USPC ................................................. 264/642, 667
See application file for complete search history.

(56) References Cited

U.S. PATENT DOCUMENTS 2,098,246 A   11/1937   Jarrier
2,200,773 A    5/1940   Finne
(Continued)

FOREIGN PATENT DOCUMENTS

CN    1522987        8/2004
CN    2784164 Y      5/2006
(Continued)

OTHER PUBLICATIONS

Abdullah, Mohd Mustafa Al Bakri, et al. "Concrete Ceramic Waste Slab (CCWS)." (2006). Published in Journal of Engineering Reasearch and Education, vol. 3, 2006, pp. 139-145 available at http://dspace.unimap.edu.my/dspace/handle/123456789/2032.*
(Continued)

*Primary Examiner* — Joseph S Del Sole
*Assistant Examiner* — Russell Kemmerle, III
(74) *Attorney, Agent, or Firm* — Fredrikson & Byron, P.A.

(57) ABSTRACT

In the method for manufacturing slabs of ceramic material which envisages preparation of an initial mix comprising ceramic sands with a grain size of less than 2 mm, preferably less than 1.2 mm, a binder and the so-called filler namely mineral powders chosen from feldspars, nephelines, sienites, mixed with clays and/or kaolinites, which powders after firing form a continuous ceramic matrix, deposition of the initial mix on a temporary support for the compaction step by means of vacuum vibrocompression, drying and firing, a binder consisting of an aqueous dispersion of colloidal silica called silicasol is used.

20 Claims, 3 Drawing Sheets

(51) Int. Cl.
*B28B 3/02* (2006.01)
*B28B 7/34* (2006.01)
*B28B 7/36* (2006.01)
*C04B 33/04* (2006.01)
*C04B 33/13* (2006.01)
*C04B 33/30* (2006.01)
*C04B 35/63* (2006.01)
*C04B 35/634* (2006.01)
*C04B 35/636* (2006.01)
*C04B 38/06* (2006.01)
*C04B 111/00* (2006.01)
*C04B 111/28* (2006.01)

(52) U.S. Cl.
CPC ... *C04B2111/00612* (2013.01); *C04B 2111/28* (2013.01); *C04B 2235/3418* (2013.01); *C04B 2235/5427* (2013.01); *C04B 2235/604* (2013.01)
USPC ........................................................ 264/642

(56) References Cited

U.S. PATENT DOCUMENTS

| | | | |
|---|---|---|---|
| 2,323,864 A | 7/1943 | Weyandt | |
| 3,426,730 A | 2/1969 | Lawson et al. | |
| 3,663,137 A | 5/1972 | Haas et al. | |
| 3,953,623 A | 4/1976 | Das | |
| 4,569,920 A | 2/1986 | Smith-Johannsen | |
| 4,617,060 A * | 10/1986 | Dreibelbis | 524/493 |
| 4,698,010 A | 10/1987 | Toncelli | |
| 4,783,435 A * | 11/1988 | Dreibelbis | 502/214 |
| 4,937,394 A * | 6/1990 | Dreibelbis | 568/896 |
| 5,013,523 A * | 5/1991 | Hata et al. | 419/19 |
| 5,031,546 A | 7/1991 | Amos et al. | |
| 5,174,823 A | 12/1992 | Darlo | |
| 5,264,168 A | 11/1993 | Toncelli | |
| 5,314,090 A | 5/1994 | Alexander | |
| 5,469,971 A | 11/1995 | Chilton et al. | |
| 5,477,307 A | 12/1995 | Bergen et al. | |
| 5,514,399 A | 5/1996 | Cordera et al. | |
| 5,820,802 A | 10/1998 | Oberoi | |
| 5,914,187 A * | 6/1999 | Naruse et al. | 428/327 |
| 5,922,254 A | 7/1999 | Ebert et al. | |
| 5,942,205 A * | 8/1999 | Murata et al. | 423/598 |
| 6,387,307 B1 | 5/2002 | Bossetti | |
| 6,461,552 B1 | 10/2002 | Geiger | |
| 6,713,015 B1 * | 3/2004 | Toncelli et al. | 264/660 |
| 7,487,892 B1 | 2/2009 | Hirsch | |
| 7,550,026 B2 * | 6/2009 | Hayakawa | 55/523 |
| 7,550,106 B2 | 6/2009 | Toncelli et al. | |
| 7,819,346 B2 | 10/2010 | Perkes | |
| 2004/0032044 A1 | 2/2004 | Toncelli | |
| 2005/0147806 A1 | 7/2005 | Toncelli | |
| 2005/0238752 A1 | 10/2005 | Toncelli | |
| 2008/0079185 A1 | 4/2008 | Jamrussamee | |
| 2008/0187742 A1 * | 8/2008 | Toncelli | 428/325 |
| 2008/0280750 A1 * | 11/2008 | Liu | 502/63 |
| 2009/0101790 A1 | 4/2009 | Toncelli | |
| 2010/0194005 A1 * | 8/2010 | Toncelli | 264/650 |
| 2011/0003366 A1 | 1/2011 | Zeikus | |
| 2011/0318483 A1 | 12/2011 | Toncelli | |

FOREIGN PATENT DOCUMENTS

| | | |
|---|---|---|
| EP | 0378275 A | 7/1990 |
| EP | 0962294 A2 | 12/1999 |
| EP | 1510314 | 3/2005 |
| EP | 1787779 | 5/2007 |
| GB | 2310161 | 8/1997 |
| IT | 1242777 B | 5/1994 |
| IT | TV940091 | 1/1996 |
| IT | 1293176 B1 | 10/1998 |
| JP | 57194034 A | 11/1982 |
| JP | 01043336 A | 2/1989 |
| JP | 2002348722 A | 12/2002 |
| RU | 2283818 | 7/2006 |
| WO | 9615888 | 5/1996 |
| WO | 9846543 A | 10/1998 |
| WO | 0117741 A1 | 3/2001 |
| WO | 03027042 | 4/2003 |
| WO | 2004022295 A1 | 3/2004 |
| WO | 2004039547 | 5/2004 |
| WO | 2006045728 | 5/2006 |
| WO | 2006048438 A1 | 5/2006 |
| WO | 2006122892 | 11/2006 |
| WO | 2007009860 A1 | 1/2007 |
| WO | 2009010406 | 1/2009 |

OTHER PUBLICATIONS

"PCT International Search Report for PCT/IB2008/050966 dated Mar. 17, 2009, from which the instant application is based," 3 pgs.
"PCT Written Opinion for PCT/IB2008/050966 dated Mar. 17, 2009, from which the instant application is based," 4 pgs.
Chinese Office Action, dated Jan. 11, 2012 for related Chinese Application No. 200880010307.2, 10 pages.
Russian Office Action, dated Sep. 28, 2011 for related Russian Application No. 2009139778 (with English-language translation), 7 pages.
PCT International Search Report dated Jun. 11, 2010 for PCT/IB2010/050998, from which the instant application is based, 4 pgs.
PCT Written Opinion dated Jun. 11, 2010 for PCT/IB2010/050998, from which the instant application is based, 7 pgs.
PCT International Search Report dated Feb. 3, 2009 for PCT/EP2008/058682, from which the instant application is based, 4 pgs.
PCT Written Opinion dated Feb. 3, 2009 for PCT/EP2008/058682, from which the instant application is based, 8 pgs.
PCT International Preliminary Report on Patentability dated Sep. 16, 2009 for PCT/EP2008/058682, from which the instant application is based, 11 pgs.

* cited by examiner

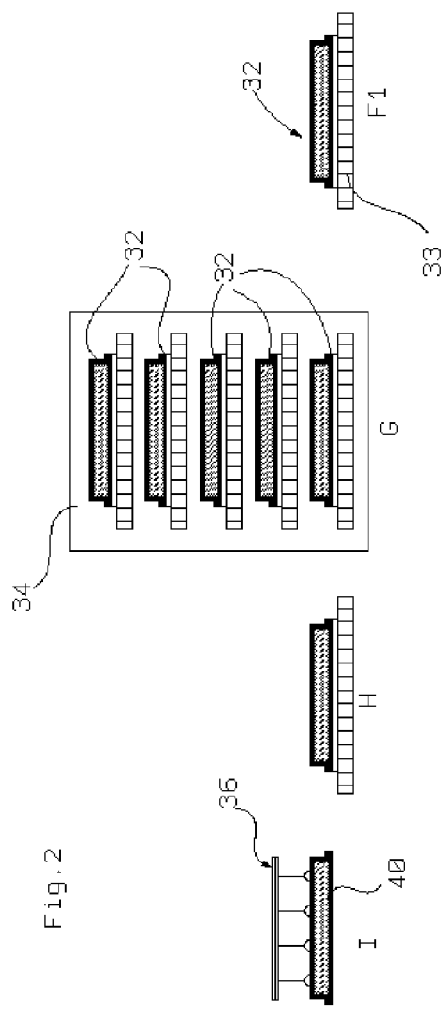
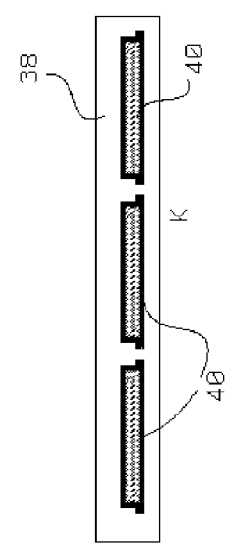
Fig. 2

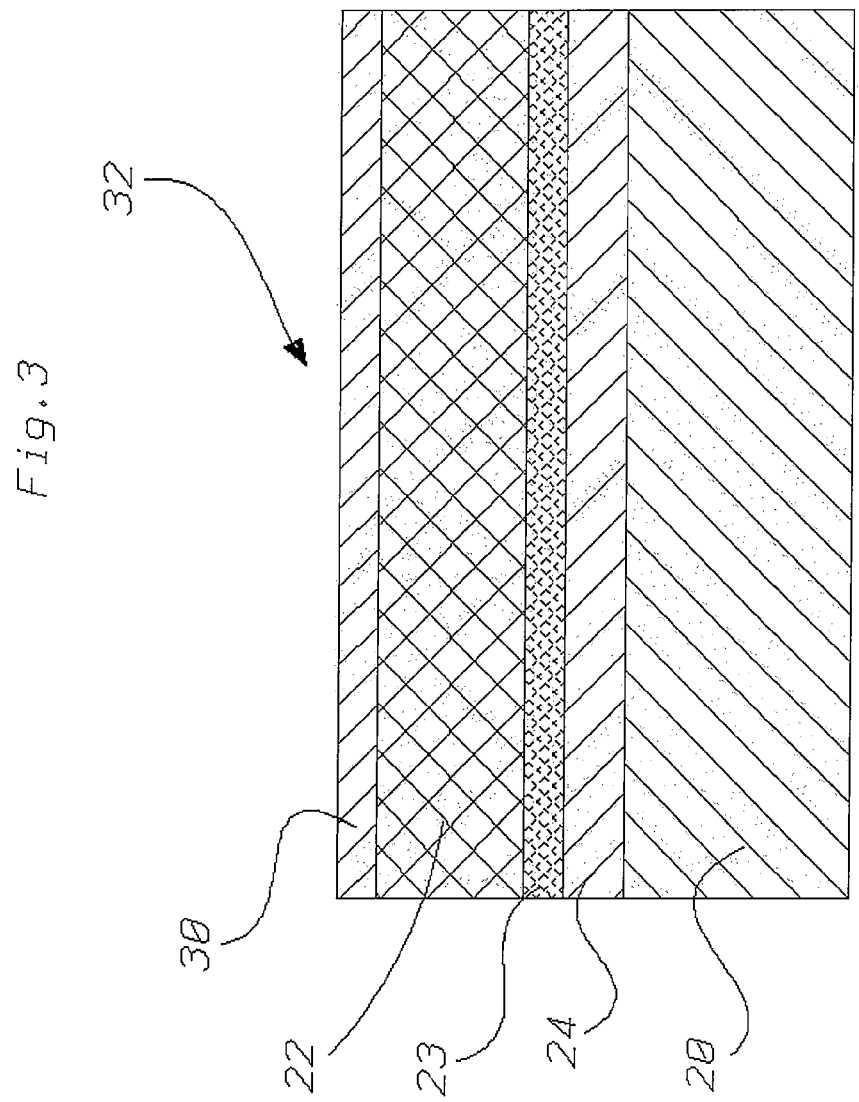

METHOD OF MANUFACTURING SLABS OF CERAMIC MATERIAL

RELATED APPLICATIONS

This application is a 35 U.S.C. 371 national stage filing from International Application No. PCT/IB2008/050966 filed Mar. 14, 2008, which claims priority to Italian Application No. TV2007A000054, filed Mar. 28, 2007, the teachings of which are incorporated herein by reference.

The present invention relates to the manufacture of slabs of ceramic material and more specifically to a method for the production of these slabs as well as to the slabs themselves. During the last 15 years the technology relating to these slabs has been gradually developed from the basic process described in European Patent No. 378 275 dated 17.04.1996, to which reference should be made for a detailed description.

In short, according to this process, a stone or stone-like material, in granular or powder form, is mixed with a ceramic bonding matrix (this term being understood as referring to a mixture of powders suitable for the production of ceramic materials by means of hot-sintering) and with an inorganic binder in an aqueous solution, for example sodium silicate, following which it is deposited in the form of a thin layer onto a temporary support or inside a mould.

For compaction of the mixture in order to form the slab, a vacuum vibrocompression step is then performed, namely the application of pressure by means of a pressure plate, applying at the same time a vibratory motion of predetermined frequency, while the material to be compacted is kept under a vacuum.

The compaction step is followed by a drying step and a firing step at a temperature which is adequate or in any case high enough to convert by means of sintering the bonding matrix into a ceramic phase which envelops and binds together the particles of stone or stone-like material.

Subsequently the method and the plant were improved (as described and claimed in Italian Patent No. 1 293 176 granted in 1999) by envisaging distribution of the starting mix on a support consisting of felt covered with a transpiring sheet of paper.

The layer of mix is then covered with a sheet of rubber, which is useful during the vacuum vibrocompression step, and the resultant rough-formed slab, freed from the rubber sheet, is transferred by gripper means onto a metallic grate or support and is introduced, on the latter, into the drying oven where, under the action of the heat (preferably in the form of forced circulation of hot air), it acquires a consistency sufficient for the subsequent handling operations.

From the drying section the rough-formed slab is transferred to the firing section, after removal of the felt on which the slab was rested and after applying onto the sheet of paper, which is still in contact with the surface of the rough-formed slab, a layer of refractory material for protecting the slab during the firing step.

During this step, prior to sintering of the ceramic bonding matrix, incineration of the paper still covering the upper surface of the rough-formed slab takes place.

In Italian Patent No. 1 311 858, granted in 2002, the method and plant described above were further improved in that the starting mix was enclosed, prior to the vibrocompression step, between two sheets of cardboard or paperboard such as to absorb the excess water of the mix before being transferred for the following drying and firing steps.

The two sheets of paperboard are removed before drying, with overturning of the compacted slab, so that during this step the rough-formed slab rests solely on the layer of fabric or porous felt.

For firing, on the other hand, the slab rests solely on the surface of the oven by means of a refractory layer having a temporary protective function.

Finally, in Italian Patent No. 1 334 424, filed on 4 Sep. 2002, the method which was gradually being improved was further modified, by forming the initial mix with ceramic sands having a grain size of less than 2.5 mm, preferably less than 1 mm, and adding to the initial mix fibres of high-melting inorganic material, preferably high-melting glass, so as to improve the mechanical properties of the slabs during drying.

For further details regarding the prior documents cited above reference should be made to the corresponding publications.

However, during industrial application of the process resulting from the various improvements gradually introduced, certain drawbacks and problems partly due to the modifications themselves have arisen.

Firstly the use of sodium silicate gives rise to problems during drying since it requires very long drying times (in the region of 36 hours or more), incompatible with an industrially practical process, owing to the formation of a glaze on the surfaces of the slab which hinders and slows down evaporation of the water.

Moreover, sodium silicate deposits remain on the surface of the slab and during the subsequent firing step produce vitreous surface depositions which result in the need for specific machining in addition to the normal finishing operations.

The difficulty in drying also results in the presence, on the surface of the slabs, after firing, of imperfections in the form of bumps which may be avoided only with the use of ceramic sand with a particularly large grain size.

A second problem relates to the non-uniform distribution of the high-melting fibres which, in some areas of the initial mix and therefore of the layer deposited in the mould, remain in the form of tufts.

After firing, and therefore with disappearance of the fibres, macroporosities remain in the thickness and/or also in the surface and have the appearance of small craters on the surface.

It is therefore clear that these problems and drawbacks are mainly associated, on the one hand, with the drying times of the sodium silicate and its fluxing action during firing and, on the other hand, with the defects dependent on the reinforcing additives of the rough-formed slab such as, precisely, the high-melting glass fibres.

The present invention aimes to solve these problems and drawbacks while maintaining the advantages already achieved with the process improvements mentioned above.

It has been found that the object of the invention is achieved in an industrially advantageous manner if, in the initial mix, in place of the sodium silicate, a dispersion in aqueous phase of colloidal silica particles of nanometric size is used as binder and liquid component of the mixture of ceramic sands and ceramic matrix in powder form, and an organic binder is used in place of the high-melting fibres.

With regard to the first characteristic feature of the method according to the present invention, namely the use, as binder, of an aqueous dispersion of colloidal silica (also known as silicasol), this consists of an ecologically compatible binder, already used in other sectors such as sand moulds for foundries.

By using silicasol it is possible to avoid the use of reinforcing fibres since, unlike sodium silicate, it is not a compound characterized by a high degree of alkalinity and therefore allows the additional use of an organic binder, such as an aqueous solution of polyvinyl alcohol or a water-soluble cellulose or a sugar.

The addition of an organic binder advantageously increases the viscosity of the fluid in the mixture and also has two highly positive features:

firstly, owing to the high degree of stickiness/adhesiveness, the compacted slab to be dried is sufficiently resistant to the handling operations to avoid the formation of flaws and cracks;

secondly, the organic binder decomposes at a temperature in the region of 300-400° C., i.e. a temperature much lower than the maximum temperature for firing of the slab, so that it is eliminated inside the firing oven before the actual sintering of the ceramic powders, without the formation of so-called "black core", namely a carbon-like residue which would otherwise form and could surface in the slab to the detriment of the aesthetic properties of the end product. Any organic binder is added to the mixture in a quantity of 20-60% of the total volume of the bonding fluid.

The present invention envisages performing preferably deposition of the layer of starting mix on a temporary support consisting of a gas and vapour-permeable material which is substantially inextensible and is recovered and reused for subsequent slab manufacturing cycles.

The term "inextensible" or "substantially inextensible" is understood as referring to a material which undergoes only a minimum amount of elongation when it is subject to a tensile stress applied along an edge thereof parallel to its plane of lie, such as that which is applied for example by gripping means in order to transport the temporary support with the layer of mix deposited on it.

As a temporary support it is possible to use strong industrial fabrics made with very rigid yarns which are resistant to the slab drying temperatures which vary between 80 and 140° C. The yarns which may be used to manufacture the industrial fabrics in question may be synthetic (such as those made of polyester, polyamide and aramide fibres) or metallic, in particular made of steel.

The substantially inextensible structure of the support allows the support with the compacted slab to be transported on a grate-like, preferably metallic surface, without being subject to any impacts which could give rise to the formation of flaws which would become apparent later during drying. Owing to the gas and vapour-permeable structure of the temporary support, evaporation of the water in the mix is obviously possible in order to perform drying of the compacted slab.

It is also possible, as an alternative, to use a temporary support which is not particularly inextensible and/or not gas and vapour-permeable, in the case where the rough-formed slab after compaction must be turned over, before drying, onto a transpirant support.

A porous sheet, for example of cardboard or paperboard, is placed onto the transpirant bottom of the tray, before spreading of the mix, and a similar sheet of cardboard or paperboard is arranged on top of the mix, so that the mix to be compacted in the form of a slab is practically enclosed in a paper or paperboard casing which, being porous and gas-permeable, allows evaporation of the mix water in order to perform drying of the compacted slab.

The two sheets of paper or paperboard are then eliminated by means of combustion during the step involving high-temperature firing of the slab.

The use of silicasol as a binder, envisaged by the present invention, avoids the formation of a vitreous layer on the surface of the dried slab so that it is possible to apply beforehand onto one or the two sheets of paper or paperboard a thin refractory layer engobe which may consist of a dispersion of high-melting powders in water which is applied for example by means of spraying and then dried. It has been established that the refractory layer during the vibrocompression step adheres to the surface of the slab with which it is in contact and subsequently, after drying of the slab and combustion of the paper, adheres to said surface, thus forming a protective layer which prevents adhesion of the slab to the rollers of the drying oven in the high-temperature zones.

Summarising, therefore, the method according to the present invention, it envisages the preparation of an initial mix (comprising ceramic sands with a grain size of less than 2 mm and preferably less than 1.2 mm, the so-called filler, namely mineral powders chosen from feldspars, nephelines, sienites, mixed with clays and/or kaolinites, which powders after firing form a continuous ceramic matrix, and a binder), the deposition of the initial mix on a temporary support for the compaction step by means of vacuum vibrocompression, drying and firing, which method is characterized in that the said binder consists of silicasol which may be mixed with an organic binder, preferably an aqueous solution of polyvinyl alcohol.

In terms of apparatus, the present invention is characterized in that the deposition of the layer of initial mix is preferably performed on a temporary support which is substantially inextensible and gas and vapour-permeable and on which, prior to the deposition of the initial mix, a protective porous layer, consisting for example of a sheet of paper or paperboard, is arranged.

According to a further aspect of the present invention, after deposition of the layer of initial mix, a second protective porous film, such as a sheet of paper or paperboard, is deposited on the upper surface of the layer of mix, following which the tray is transferred to the vacuum vibrocompression station.

A film of refractory material in an aqueous suspension or engobe is applied beforehand and dried on the surface of one of the two paperboards intended to make contact with the mix, said film, during drying, adhering to the mix so as to form a protective layer for the slab during firing, with the function of preventing bonding between the slab and the conveying rollers of the firing oven.

The compacted slab is then placed on top of a grate-like—preferably metallic—surface, for drying, for example by means of transportation of the inextensible support on which the slab may be vibrocompacted.

After drying, the slab is transferred to the firing oven.

As can be understood from the description which follows of a preferred embodiment of the invention, provided with reference to the accompanying drawings, the advantages achieved with the invention are many and, of these, the main ones are as follows:

(1) the use of silicasol allows the drying times to be reduced to values not greater than 24 hours, does not have any fluxing effect and does not cause any increase in the vitreous nature or fragility of the slab after firing;

(2) the use of silicasol allows the use, in the mixture, of viscous and adhesive organic binders, thus avoiding the use of high-melting fibres and therefore avoiding the formation of bumps and/or macroporosity;

(3) owing to the use of an organic binder in the mixture, in particular polyvinyl alcohol, it is possible to avoid not only the use of high-melting fibres, but also the formation of intrinsic defects in the final slab, preventing cracking during the drying step;

(4) owing to the use of silicasol, which prevents the formation of a vitreous surface layer, it is possible to use two sheets of paper or paperboard to enclose the layer of initial mix prior to vibrocompression, which paperboard is subsequently eliminated by means of combustion;

(5) the use of silicasol, preventing the formation of a vitreous surface layer, allows the application beforehand onto the surface of one of the two sheets of paper or paperboard in contact with the mix of a refractory layer or engobe which adheres to the surface of the slab after the paper drying and combustion steps;

(6) owing to the use of paperboard, it is possible to use a substantially inextensible gas-permeable support which is transported onto the metallic drying grate, preventing damaging operations involving overturning of the compacted slab.

(7) the use of silicasol prevents the formation of vitreous surface depositions which would result from the residual sodium silicate impregnating the separating paperboard.

The accompanying drawings show a part of the apparatus according to the invention during the various steps of the slab manufacturing cycle.

More specifically:

FIG. 2 shows the drying and firing section of the plant; and

FIG. 3 shows an enlarged cross-section of the slab prior to the drying step.

Figure 1:
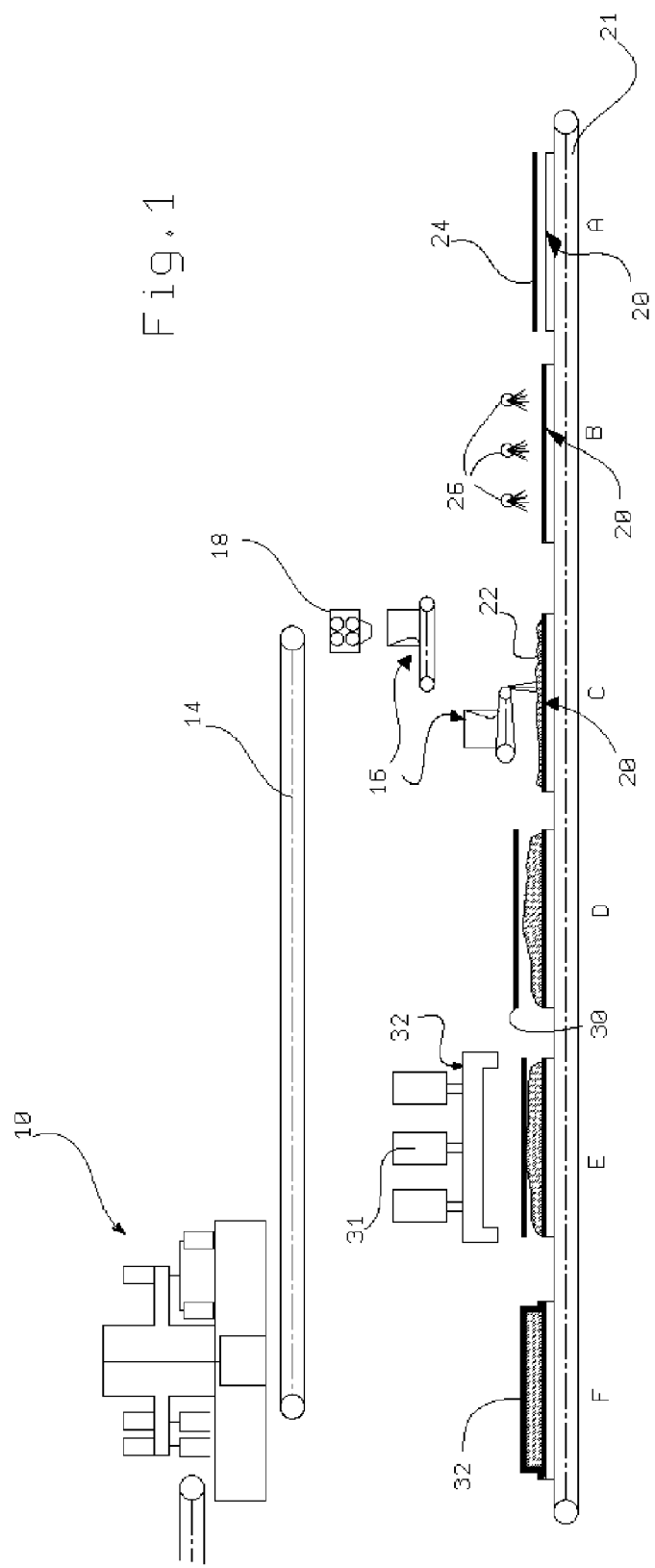
FIG. 1 shows in schematic form the section of the plant where the starting mix is spread on the transpirant supports and compacted by means of vacuum vibrocompression.

With reference to FIG. 1, 10 denotes overall an aggregating ring which receives the mixes prepared in a plurality of mixers—situated upstream and not shown—which prepare single mixes using the methods indicated below and discharge them onto a conveyor belt which in turn supplies the aforementioned accumulator.

Each mixer is supplied with a metered mixture of sand consisting of sands with different grain sizes (up to 0.1 mm, from 0.1 to 0.3 mm, from 0.3 to 0.6 mm and from 0.6 to 1.2 mm) in the quantities calculated using a formula, such as Bolomy's formula for example.

The desired quantity of the filler mentioned above (preferably a mixture of nepheline/feldspar and kaolin/kaolinite) and finally a mixture consisting of the inorganic binder consisting of the already mentioned silicasol and organic binder preferably an aqueous solution of polyvinyl alcohol) are then supplied to the mixer.

When the slab to be produced consists of mixes which are different from each other, for example and principally with different colours, the aggregating ring has the function of forming a single mix comprising the individual mixes which nevertheless maintain their individual character.

Further details regarding this aggregating ring are provided in Italian Patent No. 1242777.

The mix leaving the aggregating ring is fed by means of the conveyor belt 14 to a loader/distributor 16 after passing through a crushing device 18.

Further details regarding the loader/distributor may be obtained from the International Patent Application No. PCT/EP 2005/055736, while for the crushing device reference may be made to Italian Utility Model No. 223042.

The loader/distributor 16 performs deposition of a layer of mix 22 of the desired thickness onto a temporary inextensible and gas and vapour-permeable support 20 placed on a conveying system such as a motor-driven conveyor belt 21 so as to perform intermittent feeding in order to bring each mould into a plurality of successive operating positions, identified by A, B, etc.

As can be understood from FIG. 1, prior to deposition of the layer of mix 22, the surface of the temporary support 20 is covered (position A) with a porous sheet of paper or paperboard 24. A second sheet of paper or paperboard 30 is placed on the mix distributed in the successive position D.

A layer of refractory material 23 is applied beforehand (position B) and dried on the surface of one of the two paperboards making contact with the mix, and the layer of mix 22 is then deposited (position C) on it.

It is possible and may be envisaged applying and drying beforehand off-line the refractory layer on the paperboard 24, which is then positioned on the support 20 in the position A, so that from this position one passes directly to the step indicated by the position C.

In the following position E the layer of mix 22 undergoes compaction by means of the action of a vibrating press 31, while at the same time the support with the mix is subject to a vacuum at a residual pressure in the region of 20-40 mmbar.

The position F shows the compacted rough-formed slab resting on the transpirant support, denoted overall by the reference number 32, and ready for the subsequent drying and firing steps shown in FIG. 2.

F1 denotes the position where the slab with the transpirant support is placed on the metallic grate 33 on which it will be subsequently dried.

The rough-formed slabs are conveyed into the drying oven position G), denoted generally by the reference number 34, and are kept for a few hours at a suitable temperature in order to eliminate the water present and acquire a mechanical strength sufficient for the subsequent handling operations.

This result is also possible, as already mentioned, owing to the use of the organic binder which has a greater stickiness/adhesiveness, so that the components of the mix and therefore the rough-formed slab are more easily bonded to each other.

Upon leaving the drying oven the grille 33 with the transpirant support and dried slab is brought into the position I where it is acted on by a suction pick-up device 36 (of the type normally used during the machining of slab-like materials for handling and movement thereof. This pick-up device removes the dried slab from the support and then transfers it into the drying oven 38.

Cooling stations are envisaged downstream of the firing oven and from here the slabs then pass to the surface machining and finishing lines.

Slabs manufactured with the method described above have at the end a density of about 2.4 kg/dm$^3$ and a flexural strength of about 400 kg/cm$^2$.

By way of confirmation of the above, two slabs were produced, said slabs being made with a mix having the following volumetric composition:

| | |
|---|---|
| Binder: | 20% |
| Filler (mixture of kaolinite and feldspar) | 30% |
| Ceramic sand with grain size from 0.1 a 1.2 mm: | 50% |

In the first slab an aqueous solution of sodium silicate at 36 Baumè was used, while in the second slab a mixture containing 70% silicasol and 30% polyvinyl alcohol in an aqueous solution was used as binder. The two slabs, after compaction were both dried at a temperature of 90° C.: the first slab reached the dried condition in 36 hours, while the second slab reached the dried state in 24 hours.

Then the two slabs were fired at a temperature of 1,200° C. After firing, the first slab had bumps on the surface, while the second slab had a perfectly flat and smooth surface.

The invention claimed is:

1. A method for manufacturing slabs of ceramic material, the method comprising:
   preparing an initial mix, the initial mix comprising ceramic sands, a binder and a filler, the ceramic sands having a grain size of less than approximately 2 mm, the binder excluding fibers of high-melting inorganic material and comprising an aqueous dispersion of colloidal silica called silicasol mixed with a component for enhancing mechanical properties of the mix during drying and firing step, and the filler comprising mineral powders mixed with clays and/or kaolinites, the mineral powders being chosen from feldspars, nephelines and sienites, which powders after firing form a continuous ceramic matrix, the component characterized as decomposing entirely at a temperature lower than firing temperature of the mix, the component being an organic binder;
   depositing the initial mix on a temporary support;
   compacting the deposited mix by means of vacuum vibro-compression; and
   drying and firing the compacted mix.

2. The method according to claim 1, wherein the organic binder is selected from the group consisting of: an aqueous solution of polyvinyl alcohol, a water-soluble cellulose and a sugar.

3. The method according to claim 1, further comprising covering the temporary support with a sheet of porous material, prior to depositing the initial mix on the temporary support, such that the initial mix is deposited onto the sheet of porous material.

4. The method according to claim 3, wherein the porous material is paper or paperboard.

5. The method according to claim 3, wherein the sheet of porous material is covered, on a side that contacts the deposited mix, with a protective refractory layer.

6. The method according to claim 1, wherein the temporary support is inextensible and gas and vapour-permeable and able to be transported together with the deposited initial mix.

7. The method according to claim 6, further comprising placing a sheet of porous material on the temporary support, prior depositing the initial mix on the temporary support.

8. The method according to claim 1, further comprising placing a sheet of porous material on an upper surface of the deposited initial mix.

9. The method according to claim 8, wherein the sheet of porous material is paper or paperboard.

10. The method according to claim 9, wherein the sheet of porous material is covered, on a side that contacts the deposited mix, with a protective refractory layer.

11. The method according to claim 8, further comprising covering the temporary support with a sheet of porous material, prior to depositing the initial mix on the temporary support, such that the initial mix is deposited onto the sheet of porous material that covers the temporary support.

12. The method according to claim 1, wherein the ceramic sands have a grain size of less than 1.2 mm.

13. The method according to claim 1, wherein the initial mix is formed of a plurality of components, the components comprising the ceramic sands, the binder and the filler, the components provided together so as to be collectively formable into a rigid slab.

14. The method according to claim 1, wherein the initial mix is formed of a plurality of components, the components comprising the ceramic sands, the binder and the filler, the components running together so as to be collectively formable into a rigid slab.

15. The method according to claim 1, wherein drying and firing the compacted mix results in the slabs of ceramic material being rigid in form.

16. The method according to claim 1, wherein the slabs of ceramic material following the drying and firing steps have a density of about 2.4 kg/dm$^3$.

17. The method of claim 1, wherein a quantity of the organic binder, that is mixed with the silicasol, ranges from approximately 20% to approximately 60% of total volume of the mixture with the silicasol.

18. The method of claim 1, wherein the component is characterized to entirely decompose at a temperature in range of 300-400° C.

19. The method of claim 1, wherein the initial mix excludes said fibers of high-melting inorganic material.

20. A method for manufacturing slabs of ceramic material, the method comprising:
   preparing an initial mix, the initial mix comprising ceramic sands, a binder and a filler, the ceramic sands having a grain size of less than approximately 2 mm, the binder excluding fibers of high-melting inorganic material and comprising an aqueous dispersion of colloidal silica called silicasol mixed with a component for enhancing mechanical properties of the mix during drying and firing step, and the filler comprising mineral powders mixed with clays and/or kaolinites, the mineral powders being chosen from feldspars, nephelines and sienites, which powders after firing form a continuous ceramic matrix, the component characterized as decomposing entirely at a temperature lower than firing temperature of the mix, the component being an organic binder;
   depositing the initial mix on a temporary support;
   compacting the deposited mix by means of vacuum vibro-compression;
   drying and firing the compacted mix;
   placing a sheet of porous material on an upper surface of the deposited initial mix prior to the drying and firing, the sheet of porous material being covered, on a side that contacts the deposited mix, with a protective refractory layer.

* * * * *